US008750197B2

(12) United States Patent
Yang et al.

(10) Patent No.: US 8,750,197 B2
(45) Date of Patent: Jun. 10, 2014

(54) METHOD, APPARATUS AND SYSTEM FOR PUSHING INFORMATION, AND METHOD AND APPARATUS FOR OBTAINING INFORMATION

(75) Inventors: Hui Yang, Beijing (CN); Zhihao Xing, Beijing (CN); Houcheng Tang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 297 days.

(21) Appl. No.: 13/300,975

(22) Filed: Nov. 21, 2011

(65) Prior Publication Data

US 2012/0063385 A1 Mar. 15, 2012

Related U.S. Application Data

(63) Continuation of application No. PCT/CN2009/071933, filed on May 22, 2009.

(51) Int. Cl.
*H04W 40/00* (2009.01)
(52) U.S. Cl.
USPC ............................. 370/315; 370/252; 375/259
(58) Field of Classification Search
USPC .................. 370/315, 252, 338, 254, 469; 455/404.1, 456.3, 569.1, 41.2, 41.3
See application file for complete search history.

(56) References Cited

U.S. PATENT DOCUMENTS

| | | | | |
|---|---|---|---|---|
| 7,869,763 | B2 * | 1/2011 | Lee et al. | 455/41.2 |
| 8,000,753 | B2 * | 8/2011 | Choi et al. | 455/569.1 |
| 8,046,431 | B2 * | 10/2011 | Kim et al. | 709/217 |
| 8,149,849 | B2 * | 4/2012 | Osborn et al. | 370/401 |
| 8,200,155 | B2 * | 6/2012 | Lee et al. | 455/41.2 |
| 8,385,323 | B2 * | 2/2013 | Rudland | 370/351 |
| 2007/0030848 | A1 | 2/2007 | Miyata et al. | |
| 2007/0268866 | A1 * | 11/2007 | Choi | 370/331 |
| 2008/0291854 | A1 * | 11/2008 | Sim et al. | 370/310 |
| 2009/0036055 | A1 * | 2/2009 | Choi et al. | 455/41.2 |

FOREIGN PATENT DOCUMENTS

CN 1905527 A 1/2007

(Continued)

OTHER PUBLICATIONS

Written Opinion of the International Searching Authority in International Application No. PCT/CN2009/071933 mailed Feb. 25, 2010.
English-language International Search Report in International Application No. PCT/CN2009/071933 mailed Feb. 25, 2010.

(Continued)

*Primary Examiner* — Rasheed Gidado
(74) *Attorney, Agent, or Firm* — Slater & Matsil, L.L.P.

(57) ABSTRACT

In the field of mobile communications, a method, an apparatus, and a system for pushing information, and a method and an apparatus for obtaining information are provided. The method for pushing information includes: generating a Zigbee message, adding push information to the Zigbee message, and sending the Zigbee message carrying the push information to a Zigbee mobile terminal in a Zigbee information push network; or includes: forwarding a Zigbee information request message sent by a Zigbee mobile terminal in a Zigbee information push network to an Application Server (AS), receiving a Zigbee information response message that carries push information and is returned by the AS, and forwarding the Zigbee information response message to the Zigbee mobile terminal. The method for obtaining information includes: receiving a Zigbee message from a Zigbee information node and extracting push information.

7 Claims, 14 Drawing Sheets

(56) References Cited

FOREIGN PATENT DOCUMENTS

| | | |
|---|---|---|
| CN | 101312419 A | 11/2008 |
| JP | 2007272399 | 10/2007 |
| KR | 2002-0053497 A | 7/2002 |
| KR | 10-2006-0135115 A | 12/2006 |
| WO | WO 2008/066212 A1 | 6/2008 |

OTHER PUBLICATIONS

First Chinese Office Action of Chinese Application No. 200980000118.1 mailed Nov. 22, 2012, 11 pages.

Second Office Action of Chinese Application No. 200980000118.1, mailed Jul. 9, 2013, 7 pages. (Partial Translation).

* cited by examiner

METHOD, APPARATUS AND SYSTEM FOR PUSHING INFORMATION, AND METHOD AND APPARATUS FOR OBTAINING INFORMATION

CROSS-REFERENCE TO RELATED APPLICATIONS

This application is a continuation of International Application No. PCT/CN2009/071933, filed on May 22, 2009, which is hereby incorporated by reference in its entirety.

FIELD OF THE INVENTION

The present invention relates to the field of mobile communications, and in particular, to a method, an apparatus and a system for pushing information, and a method and an apparatus for obtaining information.

BACKGROUND OF THE INVENTION

In a wireless communication system, pushing information to mobile terminals in a certain range is an important application. Pushing may provide various types of information for mobile terminals, such as advertisement information interesting to mobile users and a variety of public information. The pushing range is determined by the position of a mobile terminal; provided that the position information of the mobile terminal can be obtained, information may be pushed to the mobile terminal.

In the prior art, a base station (BS) in a mobile communication network is used to determine the position of a mobile terminal, and push information according to the position information of the mobile terminal obtained through positioning. In the process of implementing the present invention, the inventor finds that the prior art has at least the following disadvantages: a new entity, that is, a Position Determining Entity (PDE), needs to be added to the mobile communication network; the PDE calculates the position information of the mobile terminal according to positioning parameters obtained by the BS, such as pilot information, and then pushes information. Additionally, software of the mobile terminal also needs to be modified accordingly. The precision of positioning and pushing is in an order of magnitude of about 100 meters, and can merely reach 100 meters at most, and it is difficult to implement short-distance pushing.

SUMMARY OF THE INVENTION

Embodiments of the present invention provide a method, an apparatus, and a system for pushing information, and a method and an apparatus for obtaining information, so as to extend the transmission range of information push and reduce the cost of information push. The technical solutions are as follows.

A method for pushing information includes: generating a Zigbee message; adding push information to the Zigbee message; and sending the Zigbee message carrying the push information to a Zigbee mobile terminal in a Zigbee information push network.

A method for pushing information includes: receiving a Zigbee information request message from a Zigbee mobile terminal in a Zigbee information push network; forwarding the Zigbee information request message to an Application Server (AS), and receiving a Zigbee information response message that carries push information and is returned by the AS; and forwarding the Zigbee information response message to the Zigbee mobile terminal.

A method for obtaining information includes: receiving a Zigbee message from a Zigbee information node; and extracting push information of the Zigbee information node from the Zigbee message.

A node includes: a generating module, configured to generate a Zigbee message and add push information to the Zigbee message; and a push module, configured to send the Zigbee message carrying the push information to a Zigbee mobile terminal in a Zigbee information push network where the node is located.

A gateway includes: a receiving module, configured to receive a Zigbee information request message sent from a Zigbee mobile terminal in a Zigbee information push network, and receive a Zigbee information response message that carries push information and is returned by an AS; and a sending module, configured to forward the Zigbee information request message received by the receiving module to the AS, and forward the Zigbee information response message received by the receiving module to the Zigbee mobile terminal.

A mobile terminal includes: a receiving module, configured to receive a Zigbee message sent from a Zigbee information node in a Zigbee information push network; and an obtaining module, configured to extract push information of the Zigbee information node from the Zigbee message received by the receiving module.

A system for pushing information, capable of communicating with a Zigbee mobile terminal, includes: a Zigbee information node, configured to generate a Zigbee message, add push information to the Zigbee message, and send the Zigbee message carrying the push information to the Zigbee mobile terminal.

In the technical solutions according to the embodiments of the present invention, the transmission range of the information push service is extended by introducing the Zigbee technology, and information push in the range of 10 meters to 100 meters can be implemented, so that the disadvantages of the prior art are overcome. Because no BS is required, the cost is greatly reduced.

DETAILED DESCRIPTION OF THE EMBODIMENTS

To make the technical solutions, objectives, and advantages of the present invention more comprehensible, the embodiments of the present invention are described in further detail below with reference to accompanying drawings.

Embodiments of the present invention provide a method for pushing information, a method for obtaining information, a node, a gateway, a mobile terminal, and a system for pushing information, so as to push information to the mobile terminal based on a short-distance position service, and apply a Zigbee wireless sensor network technology to implement information push.

The Zigbee wireless sensor network technology is a wireless communication technology characterized by short distance, low complexity, low power consumption, low data rate, and low cost. Zigbee works in radio bands of 868/915 MHz and 2.4 GHz, and can be applied to many fields such as the industry, science, and medical equipment. Zigbee has a transmission range with a radius of 10-100 meters, and supports a transmission data rate of 20-250 Kbps. Each Zigbee coordinator supports 255 devices at most, and one Zigbee network can support 65,535 devices at most. Zigbee has the advantages of strong networking capability, low power consumption, and low cost. The conventional Zigbee technology is mainly applied to detecting and monitoring system. For example, the temperature and the humidity in an environment are detected; and when preset values are reached, an alarm is generated or the values of temperature and the humidity are reported to a monitoring device for processing. At present, the Zigbee technology is not applied in the conventional technology of information push.

Figure 1:
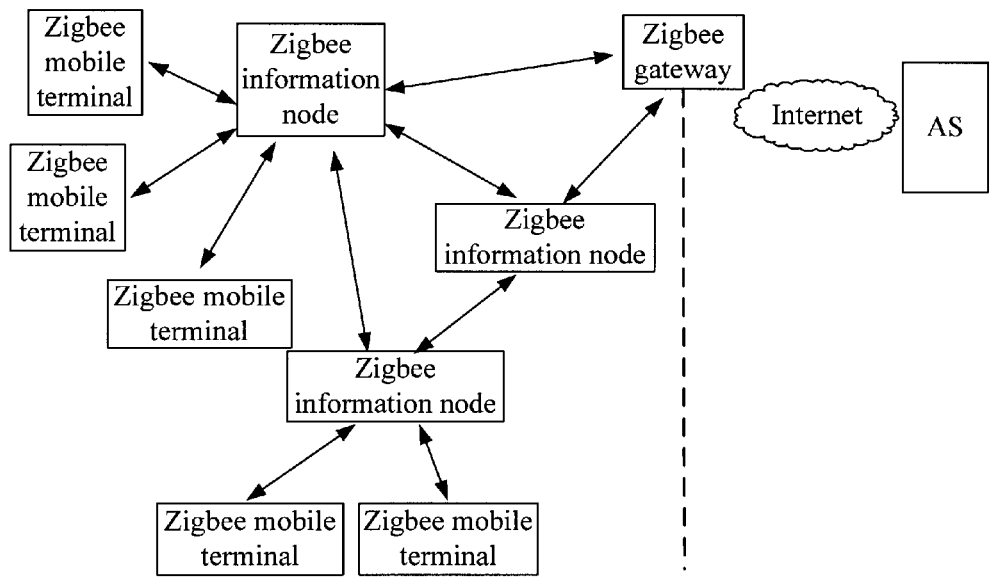
FIG. 1 is a schematic diagram of networking for pushing information according to an embodiment of the present invention.

The technical solutions according to the embodiments of the present invention are applied in the scenario where a Zigbee information node and a Zigbee mobile terminal perform wireless communication. FIG. 1 is a schematic diagram of the application scenario. The left side of a Zigbee gateway is a Zigbee information push network, which includes a gateway, Zigbee information nodes, and Zigbee mobile terminals; the right of the Zigbee gateway is an Internet Protocol (IP) network, including an AS. The gateway has functions of both a common gateway and a Zigbee gateway, and is a relay device between the Zigbee information push network and the IP network, and is generally connected to multiple Zigbee information nodes in the Zigbee information push network. The Zigbee information node is a node that has the Zigbee communication function and provides the information push service for the Zigbee mobile terminal, and uses the Zigbee technology to perform wireless communication with Zigbee mobile terminals in a certain transmission range. The transmission range is a transmission range that can be covered by the Zigbee technology; when a message is sent by the Zigbee information node, all Zigbee mobile terminals located in the range covered by the Zigbee information node can receive the message. Generally, the position of the Zigbee information node needs to be set according to requirements. For example, a Zigbee information node is placed on each floor of a mall, and a Zigbee information node is placed in a cinema. The Zigbee mobile terminal is a mobile terminal with the Zigbee communication function. When the Zigbee mobile terminal moves into the range covered by the Zigbee information node, the Zigbee mobile terminal may automatically join the network where the Zigbee information node is located.

The embodiments of the present invention define new applications for the mobile terminal and the information node respectively, and the conventional Zigbee device does not has the applications, that is, Zigbee applications for information push. In addition, the embodiments of the present invention are implemented through a protocol stack, and information push is implemented by processing the messages exchanged between the Zigbee information node and the Zigbee mobile terminal through a protocol stack.

All the gateways in the embodiments of the present invention are gateways with functions of both a common gateway and a Zigbee gateway.

Figure 2:
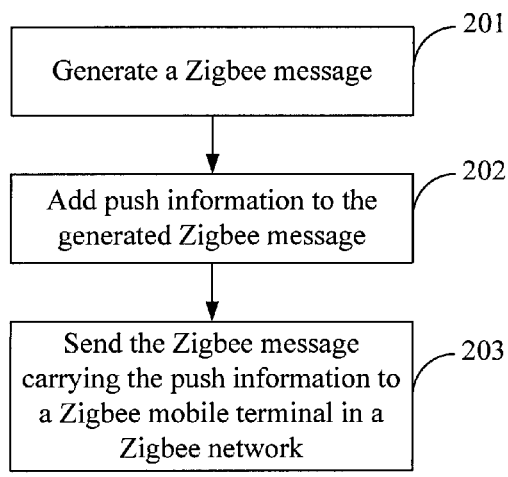
FIG. 2 is a flowchart of a method for pushing information according to an embodiment of the present invention.

As shown in FIG. 2, this embodiment of the present invention provides a method for pushing information, where the method includes the following steps.

201: Generate a Zigbee message.

202: Add push information to the generated Zigbee message.

The push information is pre-obtained, for example, from an AS. Many types of pushed information include, but are not limited to, advertisement information and news information; the push information also relates to many fields, including but not limited to, clothing, catering, movie, retail, sport, and music. The Zigbee message carrying the push information in this embodiment of the present invention is different from the Zigbee message transmitted in the conventional Zigbee technology application. The conventional Zigbee message generally carries detected signals or parameters to be reported, but does not carry push information, while the Zigbee message in this embodiment of the present invention carries push information. In addition, the content carried in the conventional Zigbee message is to be sent to a monitoring device, so that the monitoring device can perform monitoring management and maintenance according to the content after receiving the content; while the push information carried in the Zigbee message in this embodiment of the present invention is to be sent to the Zigbee mobile terminal.

203: Send the Zigbee message carrying the push information to a Zigbee mobile terminal in a Zigbee information push network.

In the method for pushing information according to this embodiment of the present invention, the transmission range of the information push service is extended by introducing the Zigbee technology, and information push in the range of 10 meters to 100 meters can be implemented, so that the disadvantages of the prior art are overcome. Because no BS is required, the cost is greatly reduced. Compared with the conventional mode in which a positioning service system pushes information according to the position information sent by a mobile terminal with the Global Positioning System (GPS) function, a GPS receiver is not required to be built in the terminal, so that the cost is reduced, and the disadvantages that the precision of positioning and pushing is influenced by the environment where the mobile terminal is located, and the positioning effect is poor, are overcome. Compared with the conventional mode in which a Bluetooth information push node is disposed for information push, the disadvantages that the energy consumption of Bluetooth devices is high, the networking capability is poor, the transmission distance is limited, and the maximum range is only 10 meters, are overcome.

The push information in this embodiment may be pushed by adopting an active push mode and a request/response push mode, where the request/response push mode further includes: direct pushing, directional pushing, and forwarding pushing. The pushing processes are respectively and specifically described below.

Figure 3:
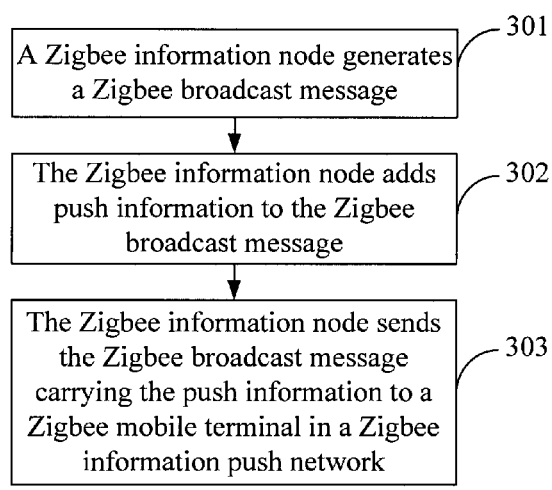
FIG. 3 is a flowchart of a method for pushing information based on an active push mode according to an embodiment of the present invention.

As shown in FIG. 3, this embodiment provides a method for pushing information based on the active push mode, where the method specifically includes the following steps.

301: A Zigbee information node generates a Zigbee broadcast message.

Figure 4:
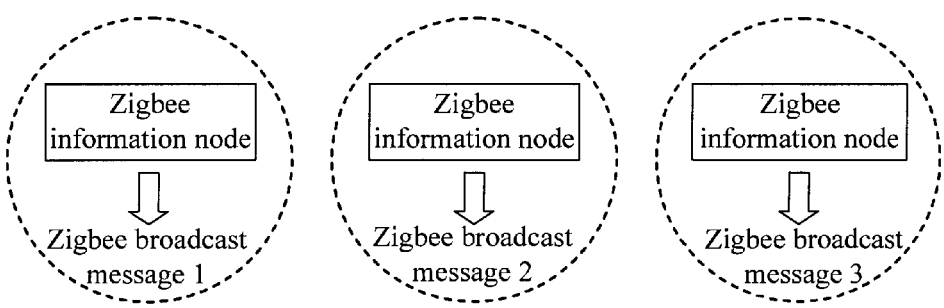
FIG. 4 is a schematic diagram of sending a Zigbee broadcast message by a Zigbee information node according to an embodiment of the present invention.

Preferably, the Zigbee information node may preset a period, and send the generated Zigbee broadcast message periodically according to the period; in addition, each Zigbee information node may set its own broadcast period, and broadcast the Zigbee broadcast message independently. As shown in FIG. 4, three Zigbee information nodes generate Zigbee broadcast message 1, Zigbee broadcast message 2, and Zigbee broadcast message 3 respectively, and broadcast the messages independently.

302: The Zigbee information node adds push information to the Zigbee broadcast message.

303: The Zigbee information node sends the Zigbee broadcast message carrying the push information to a Zigbee mobile terminal in a Zigbee information push network.

In this embodiment, information is pushed to the Zigbee mobile terminal by sending a Zigbee broadcast message, so that the transmission range of the information push service is extended, and information push in the range of 10 meters to 100 meters can be implemented. Further, the Zigbee broadcast message can be sent periodically, so information can be pushed to the Zigbee mobile terminal periodically. Because no base station is required, the cost is greatly reduced. Compared with the conventional mode in which the positioning service system pushes information according to the position information sent by the GPS-enabled mobile terminal, a GPS receiver is not required to be built in the terminal, so that the cost is reduced, and the disadvantages that the precision of positioning and pushing is influenced by the environment where the mobile terminal is located, and the positioning effect is poor, are overcome. Compared with the conventional mode in which a Bluetooth information push node is disposed for information push, the disadvantages that the energy consumption of Bluetooth devices is high, the networking capability is poor, the transmission distance is limited, and the maximum range is only 10 meters, are overcome.

Figure 5:
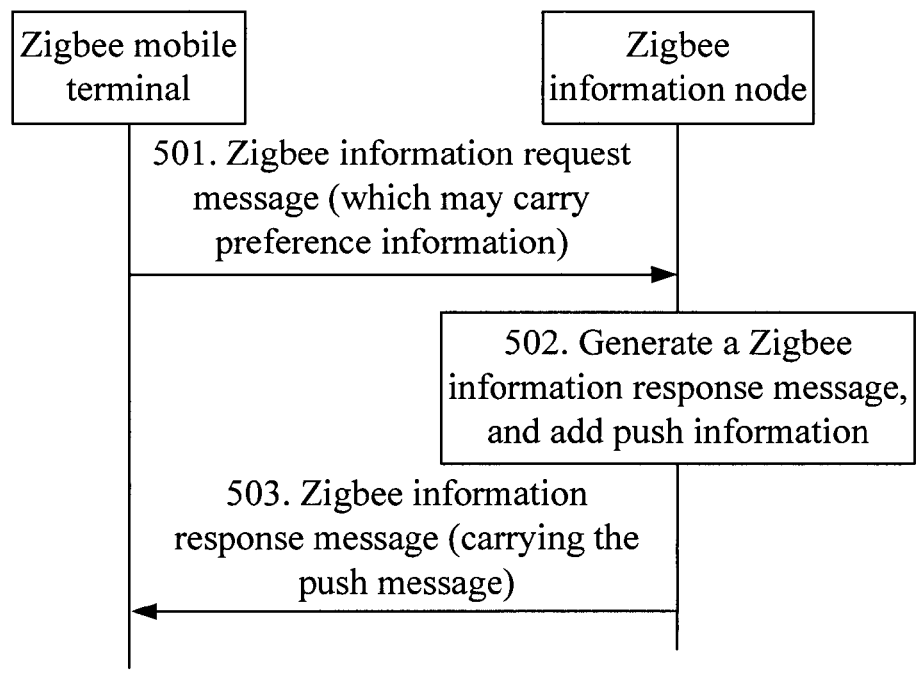
FIG. 5 is a flowchart of a method for pushing information directly based on a request/response mode according to an embodiment of the present invention.

As shown in FIG. 5, this embodiment provides a method for pushing information based on the request/response mode, in which the direct push mode is adopted, that is, the Zigbee information node pushes information to the Zigbee mobile terminal directly. The method specifically includes the following steps.

501: A Zigbee mobile terminal sends a Zigbee information request message to a Zigbee information node, so as to request to obtain information.

Optionally, the Zigbee mobile terminal may carry preference information set by a mobile user in the Zigbee information request message, such as "clothing", indicating that the Zigbee mobile terminal expects to receive clothing-related information.

502: After receiving the Zigbee information request message, the Zigbee information node generates a Zigbee information response message, and adds push information that is requested by the Zigbee mobile terminal and is locally stored to the Zigbee information response message.

If the Zigbee information request message carries no preference information, it indicates that the Zigbee mobile terminal imposes no requirement on the requested push information; in this case, the Zigbee information node may send all the push information locally stored to the Zigbee mobile terminal, or select, for example, randomly select, a part of the push information to send to the Zigbee mobile terminal.

If the Zigbee information request message carries preference information, it indicates that the Zigbee mobile terminal imposes requirements on the requested push information; in this case, the Zigbee information node provides push information for the Zigbee mobile terminal according to the preference information, that is, finds the push information related to the preference information from the push information locally stored. For example, if the Zigbee information node locally stores two types of push information: music and sport, while the preference information carried in the Zigbee information request message is music, the Zigbee information node provides music-related push information for the Zigbee mobile terminal.

503: The Zigbee information node sends the Zigbee information response message carrying the push information to the Zigbee mobile terminal.

In this embodiment, if the Zigbee information node does not find the push information compliant with the preference information locally, the Zigbee information node may return a Zigbee information response message carrying no push information, that is, the carried push information is null.

In this embodiment, the Zigbee mobile terminal sends a Zigbee information request message and the Zigbee information node returns a Zigbee information response message, thereby implementing information push to the Zigbee mobile terminal, so that the transmission range of the information push service is extended, and information push in the range of 10 meters to 100 meters can be implemented. Further, information can be pushed according to the preference information sent by the Zigbee mobile terminal, so that the favorite information of the user can be pushed to the Zigbee mobile terminal. Because no BS is required, the cost is greatly reduced. Compared with the conventional mode in which the positioning service system pushes information according to the position information sent by the GPS-enabled mobile terminal, a GPS receiver is not required to be built in the terminal, so that the cost is reduced, and the disadvantages that the precision of positioning and pushing is influenced by the environment where the mobile terminal is located, and the positioning effect is poor, are overcome. Compared with the conventional mode in which a Bluetooth information push node is disposed for information push, the disadvantages that the energy consumption of Bluetooth devices is high, the networking capability is poor, the transmission distance is limited, and the maximum range is only 10 meters, are overcome.

Figure 6:
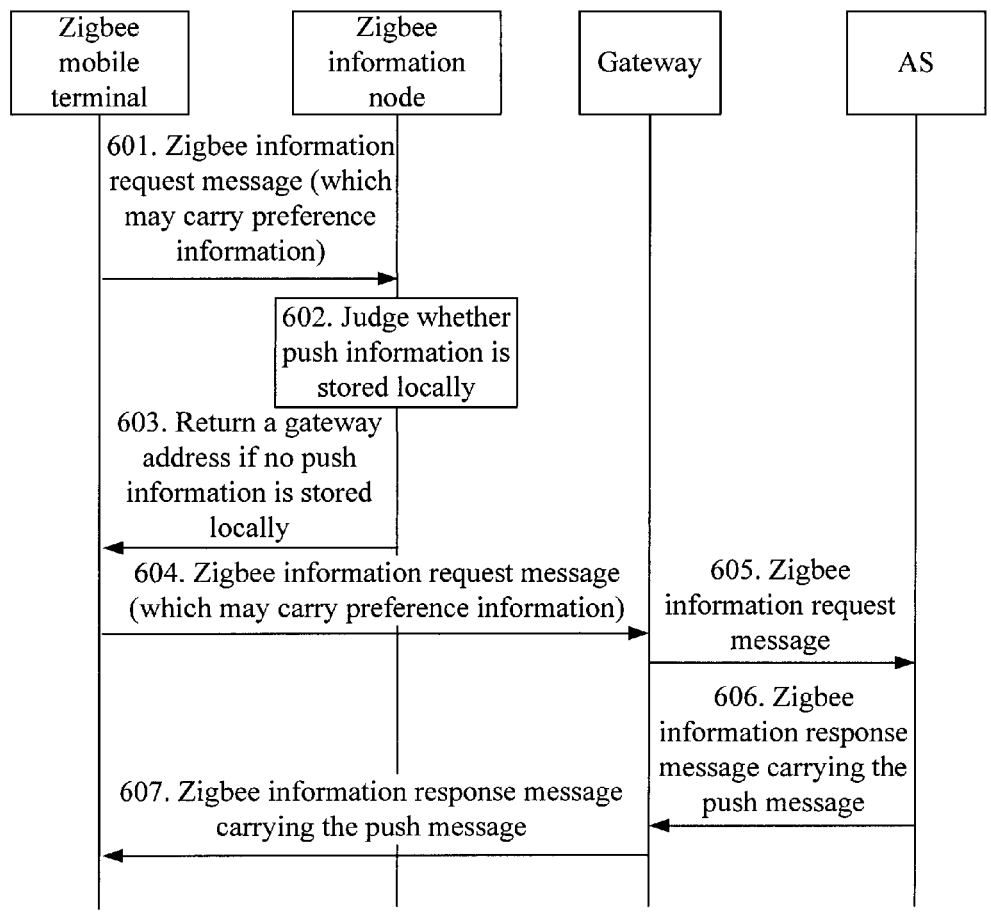
FIG. 6 is a flowchart of a method for pushing information directionally based on a request/response mode according to an embodiment of the present invention.

As shown in FIG. 6, this embodiment provides a method for pushing information based on a request/response mode, in which a directional push mode adopted, that is, the Zigbee information node cannot provide push information for the Zigbee mobile terminal, the Zigbee mobile terminal sends a request to a gateway directly, and the gateway and an AS push information to the Zigbee mobile terminal. The method specifically includes the following steps.

601: A Zigbee mobile terminal sends a Zigbee information request message to a Zigbee information node, so as to request to obtain information.

Optionally, the Zigbee mobile terminal may carry preference information set by a mobile user in the Zigbee information request message.

602: After receiving the Zigbee information request message, the Zigbee information node judges whether push information requested by the Zigbee mobile terminal is locally stored.

603: If the push information requested by the Zigbee mobile terminal is locally stored, the Zigbee information node generates a Zigbee information response message, adds the push information to the Zigbee information response message, and then sends the Zigbee information response message to the Zigbee mobile terminal. The specific process is the same as that described in the embodiment shown in FIG. 5, and is not described herein further; and if the push information requested by the Zigbee mobile terminal is not locally stored, the Zigbee information node returns a gateway address to the Zigbee mobile terminal, as shown in FIG. 6.

604: After receiving the gateway address, the Zigbee mobile terminal sends a Zigbee information request message to the gateway, so as to request to obtain information.

605: After receiving the Zigbee information request message from the Zigbee mobile terminal, the gateway forwards the Zigbee information request message to an AS in the IP network through the Internet.

606: After receiving the Zigbee information request message, the AS searches for the push information locally stored, and returns a Zigbee information response message carrying the push information requested by the Zigbee mobile terminal to the gateway.

607: The gateway forwards the Zigbee information response message to the Zigbee mobile terminal after receiving the Zigbee information response message, and the Zigbee mobile terminal obtains the push information carried in the Zigbee information response message after receiving the Zigbee information response message.

In this embodiment, the Zigbee request message sent by the Zigbee mobile terminal may carry or not carry preference information; after receiving the Zigbee information request message carrying the preference information, the AS provides push information according to the preference information. In addition, in step 602, if the Zigbee information request message received by the Zigbee information node carries preference information, the Zigbee information node may judge whether push information related to the preference information is locally stored; and if push information related to the preference information is locally stored, the Zigbee information node directly pushes the push information to the Zigbee mobile terminal, and if no push information related to the preference information is locally stored, the Zigbee information node returns the gateway address to the Zigbee mobile terminal.

In this embodiment, the Zigbee information node returns the gateway address, the Zigbee mobile terminal initiates a request to the gateway, and the AS returns a Zigbee information response message to the Zigbee mobile terminal through the gateway, thereby implementing information push to the Zigbee mobile terminal in the case that the Zigbee information node cannot provide push information, so that the transmission range of the information push service is extended, and information push in the range of 10 meters to 100 meters can be implemented. Further, information can be pushed according to the preference information sent by the Zigbee mobile terminal, so that the favorite information of the user can be pushed to the Zigbee mobile terminal. Because no base station is required, the cost is greatly reduced. Compared with the conventional mode in which the positioning service system pushes information according to the position information sent by the GPS-enabled mobile terminal, a GPS receiver is not required to be built in the terminal, so that the cost is reduced, and the disadvantages that the precision of positioning and pushing is influenced by the environment where the mobile terminal is located, and the positioning effect is poor, are overcome. Compared with the conventional mode in which a Bluetooth information push node is disposed for information push, the disadvantages that the energy consumption of Bluetooth devices is high, the networking capability is poor, the transmission distance is limited, and the maximum range is only 10 meters, are overcome.

Figure 7:
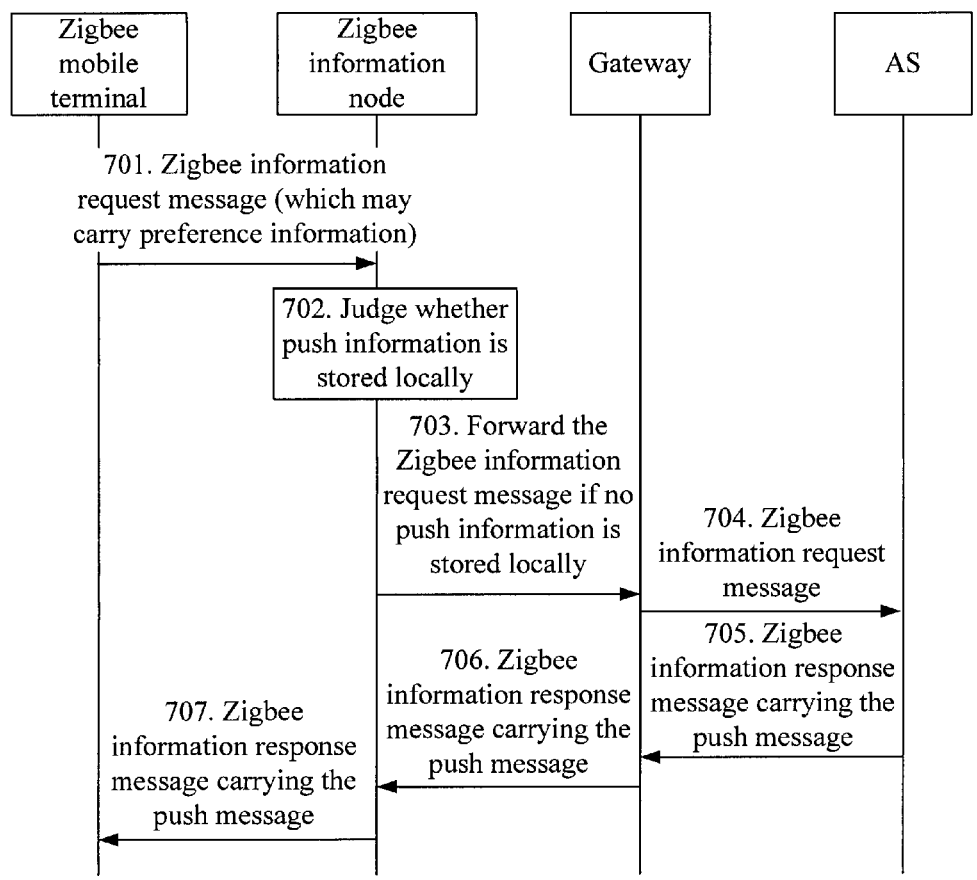
FIG. 7 is a flowchart of a method for pushing information in a forwarding push mode based on a request/response mode according to an embodiment of the present invention.

As shown in FIG. 7, this embodiment provides a method for pushing information based on a request/response mode, in which a forwarding push mode is adopted, that is, the Zigbee information node cannot provide push information for the Zigbee mobile terminal, but forwards a Zigbee information request message to a gateway, and the gateway and an AS push information to the Zigbee mobile terminal. The method specifically includes the following steps.

701: A Zigbee mobile terminal sends a Zigbee information request message to a Zigbee information node, so as to request to obtain information.

Optionally, the Zigbee mobile terminal may carry preference information set by the mobile user in the Zigbee information request message.

702: After receiving the Zigbee information request message, the Zigbee information node judges whether push information requested by the Zigbee mobile terminal is locally stored.

703. If the push information requested by the Zigbee mobile terminal is locally stored, the Zigbee information node generates a Zigbee information response message, adds the push information to the Zigbee information response message, and then sends the Zigbee information response message to the Zigbee mobile terminal. The specific process is the same as that described in the embodiment shown in FIG. 5, and is not described herein further; and if the push information requested by the Zigbee mobile terminal is not locally stored, the Zigbee information node forwards the Zigbee information request message to a gateway, as shown in FIG. 7.

704: After receiving the Zigbee information request message from the Zigbee information node, the gateway forwards the Zigbee information request message to an AS in the IP network through the Internet.

705: After receiving the Zigbee information request message, the AS searches for the push information locally stored, and returns a Zigbee information response message carrying the push information requested by the Zigbee mobile terminal to the gateway.

706: After receiving the Zigbee information response message, the gateway forwards the Zigbee information response message to the Zigbee information node.

707: The Zigbee information node forwards the Zigbee information response message to the Zigbee mobile terminal after receiving the Zigbee information response message, and the Zigbee mobile terminal obtains the push information carried in the Zigbee information response message after receiving the Zigbee information response message.

In this embodiment, the Zigbee request message sent by the Zigbee mobile terminal may carry or not carry preference information; if the Zigbee request message carries the preference information, in step 702, the Zigbee information node may judge whether the push information related to the preference information is locally stored; and if the push information related to the preference information is locally stored, the Zigbee information node directly pushes the information to the Zigbee mobile terminal, and if the push information related to the preference information is not locally stored, the Zigbee information node forwards the Zigbee information request message to the gateway. In step 704, after receiving the Zigbee information request message carrying preference information, the AS searches for the push information related to the preference information locally and returns the push information to the gateway.

In this embodiment, the Zigbee information node forwards the Zigbee information request message to the gateway, and the AS returns the Zigbee information response message to the Zigbee mobile terminal through the gateway and the Zigbee information node, thereby implementing information push to the Zigbee mobile terminal in the case that the Zigbee information node cannot provide push information, so that the transmission range of the information push service is extended, and information push in the range of 10 meters to 100 meters can be implemented. Further, information can be pushed according to the preference information sent by the Zigbee mobile terminal, so that the favorite information of the user can be pushed to the Zigbee mobile terminal. Because no base station is required, the cost is greatly reduced. Compared with the conventional mode in which the positioning service system pushes information according to the position information sent by the GPS-enabled mobile terminal, a GPS receiver is not required to be built in the terminal, so that the cost is reduced, and the disadvantages that the precision of positioning and pushing is influenced by the environment where the mobile terminal is located, and the positioning effect is poor, are overcome. Compared with the conventional mode in which a Bluetooth information push node is disposed for information push, the disadvantages that the energy consumption of Bluetooth devices is high, the networking capability is poor, the transmission distance is limited, and the maximum range is only 10 meters, are overcome.

In any one of the foregoing embodiments of the present invention, before the network side pushes information to the Zigbee mobile terminal, a process of configuring push information may be included. The specific steps are as follows.

(1) Online Configuration Mode

The AS stores configured push information, and after the Zigbee information node joins the Zigbee information push network, the AS sends the configured push information to the Zigbee information node through the gateway. The AS may further configure information for the specified information node through the gateway. Specifically, the AS may determine the Zigbee information node ID in an area according to the push information configured for the area, and send the push information of the area to each Zigbee information node in the area according to the Zigbee information node ID.

Figure 8:
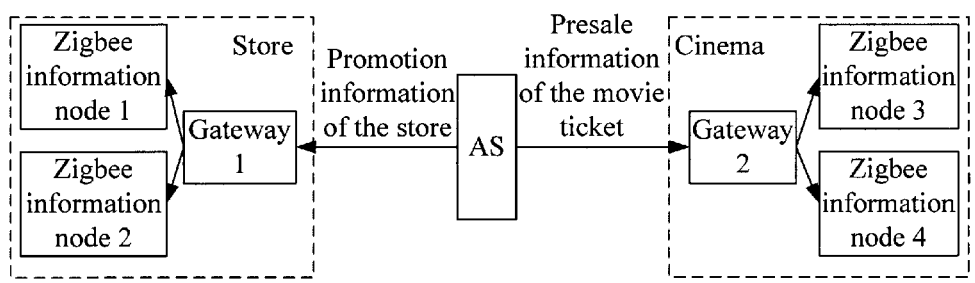
FIG. 8 is a schematic diagram of configuring push information online according to an embodiment of the present invention.

For example, FIG. 8 is a schematic diagram of configuring push information online. The AS is connected to a gateway 1 and a gateway 2 respectively; the gateway 1 is in a shop, and is connected to Zigbee information nodes 1 and 2; the gateway 2 is in a cinema, and is connected to Zigbee information nodes 3 and 4. The AS is configured with promotion information of the shop and presale information of movie tickets, and sends the promotion information of the shop to the Zigbee information nodes 1 and 2 through the gateway 1; after receiving promotion information of the shop, the Zigbee information nodes 1 and 2 store the promotion information of the shop. The AS also sends the presale information of movie tickets to the Zigbee information nodes 3 and 4 through the gateway 2, and the Zigbee information nodes 3 and 4 store the presale information of movie tickets after receiving the presale information of movie tickets.

(2) Offline Configuration Mode

Figure 9:
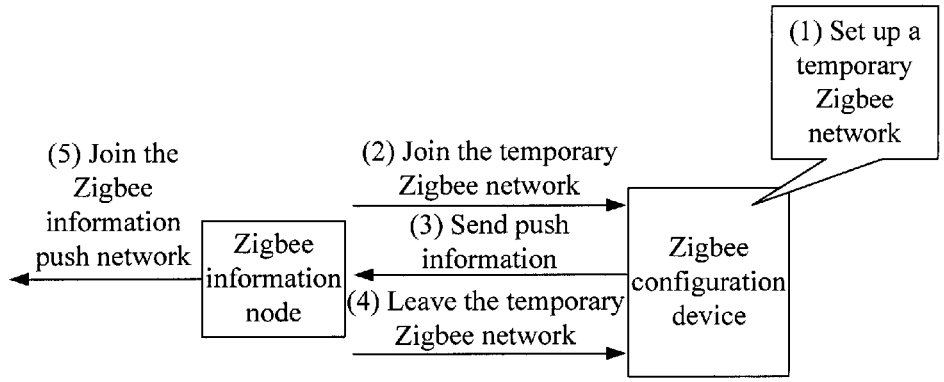
FIG. 9 is a schematic diagram of configuring push information offline according to an embodiment of the present invention.

When the Zigbee information node does not join the Zigbee information push network, the Zigbee information node is offline and equivalent to an isolated node, for example, a newly placed Zigbee information node, or a Zigbee information node that is disconnected from the joined Zigbee information push network due to certain reasons; in this case, a Zigbee configuration device may be used to perform offline configuration. The Zigbee configuration device is a mobile device which supports Zigbee applications, and is configured with push information. The configuring process is shown in FIG. 9, and specifically includes the following steps. (1) The Zigbee configuration device sets up a temporary Zigbee network. (2) The Zigbee information node that does not join the Zigbee information push network joins the temporary Zigbee network. (3) The Zigbee configuration device sends configured push information to the Zigbee information node in the temporary Zigbee network. (4) The Zigbee information node stores the push information after receiving the push information, and then leaves the temporary Zigbee network. (5) The Zigbee information node joins the Zigbee information push network again, and becomes online, so as to push information to the Zigbee mobile terminal.

The online configuration mode and the offline configuration mode may be used in combination. When the Zigbee information node is in the Zigbee information push network, the online configuration mode is used, and the AS performs configuration. When the Zigbee information node is not in the Zigbee information push network, the offline configuration mode is used, and the Zigbee configuration device performs configuration. Once the Zigbee information node joins the Zigbee information push network, the push information that is configured offline may be used, or the AS may reconfigure new push information online, or the AS may configure push information additionally on the basis of reserving the push information that is configured offline.

Figure 10:
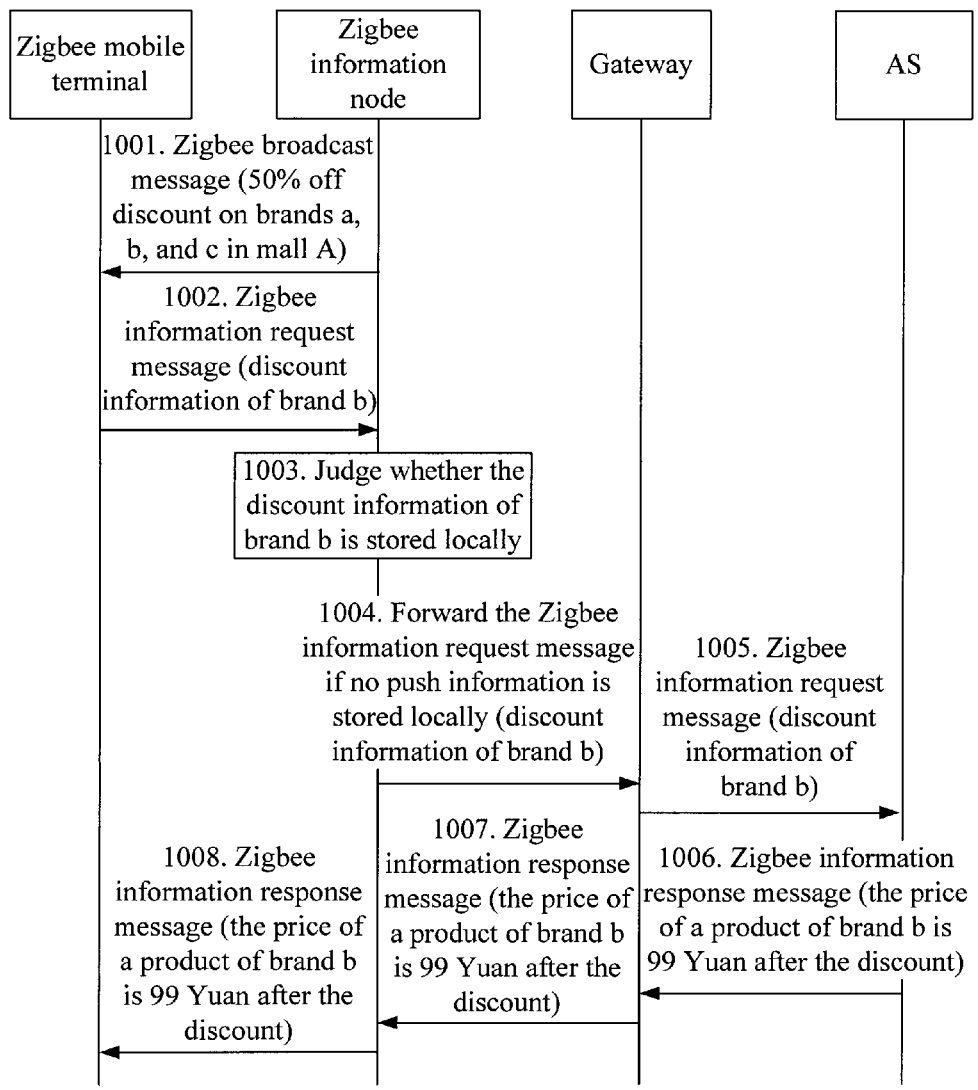
FIG. 10 is a schematic diagram of information push through active pushing and forwarding pushing in combination according to an embodiment of the present invention.

In addition, the active push mode and the request/response mode in the method according to the foregoing embodiments may be used in combination. When a Zigbee information request message is sent from the Zigbee mobile terminal, the Zigbee information node uses the response mode to perform pushing; when no Zigbee information request message is sent from the Zigbee mobile terminal, the Zigbee information node broadcasts the Zigbee broadcast message carrying the push information to the Zigbee mobile terminal, or broadcasts the Zigbee broadcast message periodically. The Zigbee mobile terminal may send a Zigbee information request message according to requirements to initiate a request, initiate a request before receiving the Zigbee broadcast message, or initiate a request after receiving the Zigbee broadcast message, and may initiate a request selectively according to the push information carried in the Zigbee broadcast message. In the combined application, the request/response mode may be any one of the three modes described in the foregoing embodiments: direct pushing, directional pushing, and forwarding pushing. The request/response mode is specifically described below with reference to FIG. 10 through active pushing and forwarding pushing in combination.

1001: The Zigbee information node sends a Zigbee broadcast message carrying push information to the Zigbee mobile terminal in the Zigbee information push network, where the push information is: 50% off discount on brands a, b, and c in mall A.

1002: After receiving the Zigbee broadcast message, the Zigbee mobile terminal selects its own interested information according to the push information, and sends a Zigbee information request message carrying preference information to the Zigbee information node, so as to request to obtain discount information of brand b.

1003: After receiving the Zigbee information request message, the Zigbee information node judges whether the discount information of brand b is locally stored.

1004: If the discount information of brand b is locally stored, the Zigbee information node returns a Zigbee information response message carrying discount information of brand b to the Zigbee mobile terminal. This embodiment emphasizes the case that no discount information of brand b is locally stored, and in this case, the Zigbee information node forwards the Zigbee information request message carrying the preference information to the gateway.

1005: After receiving the Zigbee information request message carrying the preference information from the Zigbee information node, the gateway forwards the Zigbee information request message to the AS in the IP network through the Internet.

1006: After receiving the Zigbee information request message from the gateway, the AS searches for the discount information of brand b locally, and after finding the information that the price of a product of brand b is 99 Yuan after discount, returns a Zigbee information response message carrying the information that the price of a product of brand b is 99 Yuan after discount to the gateway.

1007: After receiving the Zigbee information response message, the gateway forwards the Zigbee information response message to the Zigbee information node.

1008: The Zigbee information node forwards the Zigbee information response message to the Zigbee mobile terminal after receiving the Zigbee information response message, and after receiving the message, the Zigbee mobile terminal obtains the information that the price of a product of brand b is 99 Yuan after discount carried in the Zigbee information response message.

This embodiment combines the active push mode and the request/response mode to push information to the Zigbee mobile terminal. Therefore, the application is more flexible, the service is more comprehensive, and the user experience is improved greatly.

In any one of the foregoing embodiments according to the present invention, the AS may also set a push information keyword, and send the push information keyword to the Zigbee information node through the gateway; the Zigbee information node receives the push information keyword and sends the push information keyword to the Zigbee mobile terminal, so that the Zigbee mobile terminal can filter the obtained push information according to the push information keyword. Therefore, the Zigbee mobile terminal can further store the push information expected to receive or can further screen the push information not expected to receive and discard the push information that is received repeatedly. The Zigbee information node may carry the push information keyword in the Zigbee information response message, and send the push information keyword with the push information to the Zigbee mobile terminal; or, the Zigbee information node may also send a Zigbee message carrying the push information keyword to the Zigbee mobile terminal separately.

Figure 11:
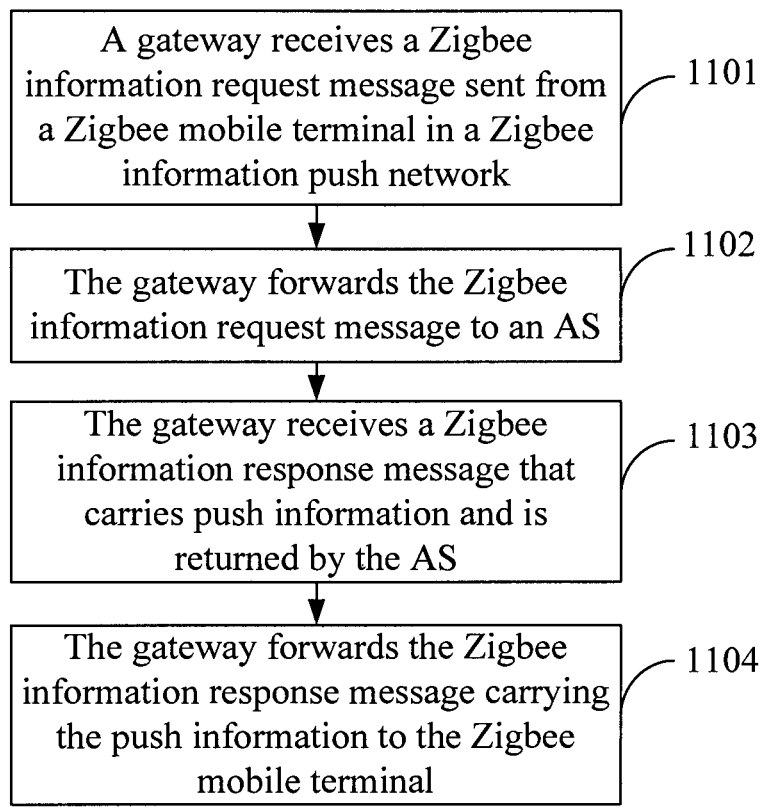
FIG. 11 is a flowchart of a method for pushing information by a gateway according to an embodiment of the present invention.

As shown in FIG. 11, this embodiment provides a method for pushing information. If a Zigbee information node from which a Zigbee mobile terminal requests to obtain the push information stores no push information, a gateway performs pushing. The method specifically includes the following steps.

1101: A gateway receives a Zigbee information request message sent from a Zigbee mobile terminal in a Zigbee information push network.

When sending the Zigbee information request message, the Zigbee mobile terminal may initiate a request to the gateway according to a gateway address sent from a Zigbee information node.

1102: The gateway forwards the Zigbee information request message to an AS.

1103: The gateway receives a Zigbee information response message that carries push information and is returned by the AS.

1104: The gateway forwards the Zigbee information response message carrying the push information to the Zigbee mobile terminal, and after receiving the message, the Zigbee mobile terminal obtains the push information carried in the Zigbee information response message.

In this embodiment, the Zigbee request message sent by the Zigbee mobile terminal may carry or not carry preference information; after receiving the Zigbee information request message carrying the preference information, the AS provides push information according to the preference information.

In this embodiment, the Zigbee mobile terminal initiates a request to the gateway, and the AS returns a Zigbee information response message to the Zigbee mobile terminal through the gateway, thereby implementing information push to the Zigbee mobile terminal in the case that the Zigbee information node cannot provide push information, so that the transmission range of the information push service is extended, and information push in the range of 10 meters to 100 meters can be implemented. Further, information can be pushed according to the preference information sent by the Zigbee mobile terminal, so that the favorite information of the user can be pushed to the Zigbee mobile terminal. Because no base station is required, the cost is greatly reduced. Compared with the conventional mode in which the positioning service system pushes information according to the position information sent by the GPS-enabled mobile terminal, a GPS receiver is not required to be built in the terminal, so that the cost is reduced, and the disadvantages that the precision of positioning and pushing is influenced by the environment where the mobile terminal is located, and the positioning effect is poor, are overcome. Compared with the conventional mode in which a Bluetooth information push node is disposed for information push, the disadvantages that the energy consumption of Bluetooth devices is high, the networking capability is poor, the transmission distance is limited, and the maximum range is only 10 meters, are overcome.

Figure 12:
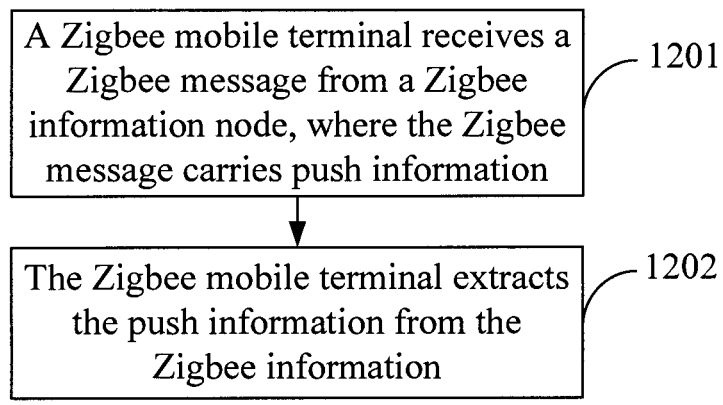
FIG. 12 is a flowchart of a method for obtaining information according to an embodiment of the present invention.

As shown in FIG. 12, this embodiment provides a method for obtaining information, where the method specifically includes the following steps.

1201: A Zigbee mobile terminal in a Zigbee information push network receives a Zigbee message from a Zigbee information node, where the Zigbee message carries push information.

1202: The Zigbee mobile terminal extracts the push information of the Zigbee information node from the received Zigbee message.

Specifically, the Zigbee message may be a Zigbee broadcast message sent by the Zigbee information node, where the Zigbee broadcast message carries the push information; or, the Zigbee message is a Zigbee information response message that carries the push information and is generated by the Zigbee information node after the Zigbee information node receives a Zigbee information request message of the Zigbee mobile terminal.

In this embodiment, if the Zigbee information node does not store the push information requested by the Zigbee mobile terminal, the Zigbee information node may return a gateway address to the Zigbee mobile terminal; the Zigbee mobile terminal sends the Zigbee information request message to a gateway according to the gateway address, receives the Zigbee information response message returned by the gateway, and obtains the push information from the Zigbee information response message, where the Zigbee information response message returned by the gateway is obtained after a request is sent to the AS.

Or, if the Zigbee information node does not store the push information requested by the Zigbee mobile terminal, the Zigbee information node may also forward the Zigbee information request message to the gateway directly, and then the gateway forwards the Zigbee information request message to the AS; the AS returns a Zigbee information response message carrying the push information to the Zigbee information node through the gateway, and then the Zigbee information node forwards the Zigbee information response message to the Zigbee mobile terminal, so that the Zigbee mobile terminal may obtain the push information from the Zigbee information response message.

In addition, in this embodiment, a filtering step may be included:

(1) Repetitive Filtering

The Zigbee mobile terminal judges whether the push information that is obtained currently is the same as the push information that have been obtained; if the push information that is obtained currently is the same as the push information that have been obtained, the Zigbee mobile terminal discards the push information that is obtained currently. Specifically, the Zigbee mobile terminal may make judgment according to the unique ID allocated by the AS for each piece of push information. For example, the AS allocates a unique ID for each piece of push information; the Zigbee mobile terminal stores the ID after receiving the push information for the first time, and when receiving pushing information again subsequently, judges whether the ID of the current push information is the same as the stored ID; if the ID of the current push information is the same as the stored ID, the Zigbee mobile terminal discards the current push information, and if the ID of the current push information is not the same as the stored ID, the Zigbee mobile terminal stores the ID of the current push information.

(2) Preference Filtering

The AS configures a corresponding keyword for the push information, and the keyword is used by the Zigbee mobile terminal to perform filtering, and in addition, the keyword may be sent to the Zigbee mobile terminal with the push information, for example, carried in the Zigbee information response message, or may be sent to the Zigbee mobile terminal separately. The keyword may be a type name, an industry name, or an area name. The Zigbee mobile terminal may also preset the preference keyword of the push information expected to receive and/or not expected to receive; after receiving the keyword of the push information sent by the AS through the gateway and the Zigbee information node, the Zigbee mobile terminal compares the received keyword with the preset preference keyword, so as to filter the obtained push information. For example, the Zigbee mobile terminal presets the preference keyword expected to receive as "clothing" and "catering", and the keywords configured by the AS are "clothing", "movie", "catering", and "retail". When the Zigbee mobile terminal receives the Zigbee information response message carrying the push information, if the keyword carried in the message is "clothing" or "catering", the Zigbee mobile terminal displays the push information to the user, and if the keyword carried in the message is not "clothing" or "catering", the Zigbee mobile terminal filters the push information without displaying the push information to the user.

The duplicate filtering mode and the preference filtering mode may be used separately, or may be used in combination, for example, the Zigbee mobile terminal uses the two modes simultaneously to filter the obtained push information. Repetitive filtering may avoid waste of the storage space of the Zigbee mobile terminal because the Zigbee mobile terminal stores the same push information that is received repeatedly, thereby improving the utilization of the Zigbee storage space. Preference filtering may enable the Zigbee mobile terminal to filter out the push information expected to receive for storage from the received push information and to screen and discard the push information not expected to receive. Therefore, the Zigbee mobile terminal can obtain the push information according to requirements, and the user experience is improved.

The Zigbee mobile terminal according to this embodiment can obtain the push information through the Zigbee technology, and compared with the prior art, the transmission range for obtaining the information push service is larger, and information obtaining in the range of 10 meters to 100 meters can be implemented. Further, the Zigbee mobile terminal according to this embodiment may filter the obtained push information, which improves the user experience. Because no base station is required, the cost is greatly reduced. Compared with the conventional mode in which the positioning service system pushes information according to the position information sent by the GPS-enabled mobile terminal, a GPS receiver is not required to be built in the terminal, so that the cost is reduced, and the disadvantages that the precision of positioning and pushing is influenced by the environment where the mobile terminal is located, and the positioning effect is poor, are overcome. Compared with the conventional mode in which a Bluetooth information push node is disposed for information push, the disadvantages that the energy consumption of Bluetooth devices is high, the networking capability is poor, the transmission distance is limited, and the maximum range is only 10 meters, are overcome.

Figure 13:
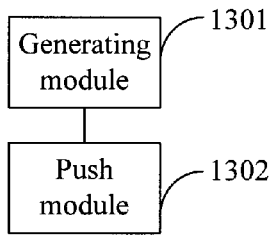
FIG. 13 is a first structure diagram of a node according to an embodiment of the present invention.

As shown in FIG. 13, this embodiment provides a node, where the node specifically includes:

a generating module 1301, configured to generate a Zigbee message, and add push information to the Zigbee message; and a push module 1302, configured to send the Zigbee message that carries the push information and is obtained by the generating module 1301 to a Zigbee mobile terminal in a Zigbee information push network where a node is located.

Figure 14:
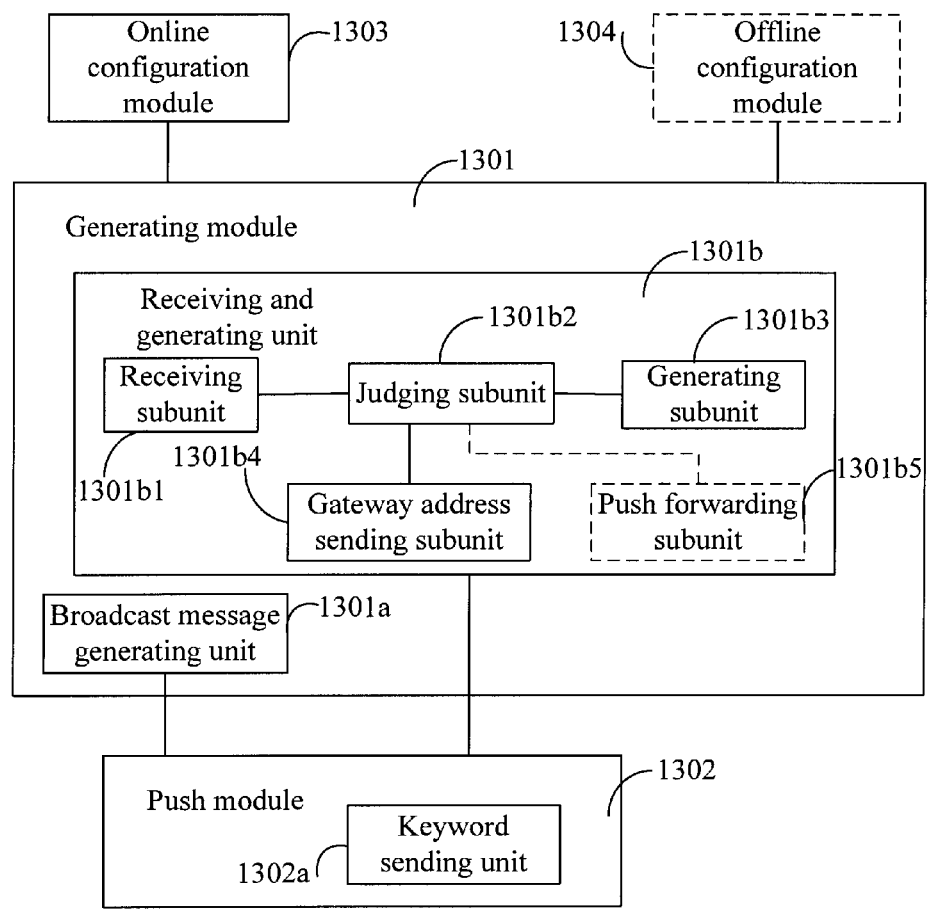
FIG. 14 is a second structure diagram of a node according to an embodiment of the present invention.

As shown in FIG. 14, the generating module 1301 may specifically include:

a broadcast message generating module 1301*a*, configured to generate a Zigbee broadcast message, add push information to the Zigbee broadcast message, which is based on an active push mode, and optionally, further broadcast the Zigbee broadcast message periodically; and/or, a receiving and generating unit 1301*b*, configured to receive the Zigbee information request message sent by the Zigbee mobile terminal in the Zigbee information push network, generate a Zigbee information response message, and add push information to the Zigbee information response message, which is based on a request/response push mode. If the Zigbee information request message carries preference information, the node may determine the corresponding push information according to the preference information, and generate a Zigbee information response message carrying the push information. In FIG. 14, the generating module 1301 including both a broadcast message generating unit 1301*a* and a receiving and generating unit 1301*b* is used as an example.

In this embodiment, the active push mode and the request/response mode may be used separately, or may be used in combination.

The receiving and generating unit 1301*b* may specifically include:

a receiving subunit 1301*b*1, configured to receive the Zigbee information request message sent from the Zigbee mobile terminal in the Zigbee information push network;

a judging subunit 1301*b*2, configured to judge whether the node stores the push information requested by the Zigbee mobile terminal after the receiving subunit receives the Zigbee information request message; and a generating subunit 1301*b*3, configured to: if the judging subunit 1301*b*2 judges that the node stores the push information requested by the Zigbee mobile terminal, generate a Zigbee information response message, and add the push information to the Zigbee information response message.

In addition, the receiving and generating unit 1301*b* may include:

a gateway address sending subunit 1301*b*4, configured to return a gateway address to the Zigbee mobile terminal if the judging subunit 1301*b*2 judges that the node stores no push information requested by the Zigbee mobile terminal, in which case the node cannot provide the information push service for the Zigbee mobile terminal, and the directional push mode is adopted, so that the Zigbee mobile terminal may request push information from the AS through the gateway; or a forwarding push subunit 1301*b*5, configured to: if the judging subunit 1301*b*2 judges that the node stores no push information requested by the Zigbee mobile terminal, forward the Zigbee information request message to the AS through the gateway, receive the Zigbee information response message that carries the push information and is returned by the AS through the gateway, and forward the Zigbee information response message to the Zigbee mobile terminal, which is based on the forwarding push mode, that is, the node cannot provide push information for the Zigbee mobile terminal, but forwards the push information to the AS through the gateway, and the AS provides the information push service.

In this embodiment, any one of the nodes may further include:

an online configuration module 1303, configured to: before the generating module 1301 adds the push information to the Zigbee message, join the Zigbee information push network, and receive the push information sent by the AS through the gateway; or an offline configuration module 1304, configured to: before the generating module 1301 adds the push information to the Zigbee message, receive the push information sent by the Zigbee configuration device in the temporary Zigbee network set up by the Zigbee configuration device, and then join the Zigbee information push network.

In this embodiment, the online configuration of the push information by the AS and the offline configuration of the push information by the Zigbee configuration device may be used separately, or may be used in combination.

In this embodiment, the push module 1302 in any one of the nodes may further include:

a keyword sending unit 1302*a*, configured to send a push information keyword configured by the AS to the Zigbee mobile terminal, where the push information keyword is used by the Zigbee mobile terminal to filter the obtained push information.

Through the node according to this embodiment, information is pushed to the Zigbee mobile terminal, so that the transmission range of the information push service is extended, and information push in the range of 10 meters to 100 meters can be implemented. Further, the Zigbee broadcast message may be sent periodically, and therefore information may be pushed to the Zigbee mobile terminal periodically. Further, information can be pushed according to the preference information sent by the Zigbee mobile terminal, so that the favorite information of the user can be pushed to the Zigbee mobile terminal. Because no base station is required, the cost is greatly reduced. Compared with the conventional mode in which the positioning service system pushes information according to the position information sent by the GPS-enabled mobile terminal, a GPS receiver is not required to be built in the terminal, so that the cost is reduced, and the disadvantages that the precision of positioning and pushing is influenced by the environment where the mobile terminal is located, and the positioning effect is poor, are overcome. Compared with the conventional mode in which a Bluetooth information push node is disposed for information push, the disadvantages that the energy consumption of Bluetooth devices is high, the networking capability is poor, the transmission distance is limited, and the maximum range is only 10 meters, are overcome.

Figure 15:
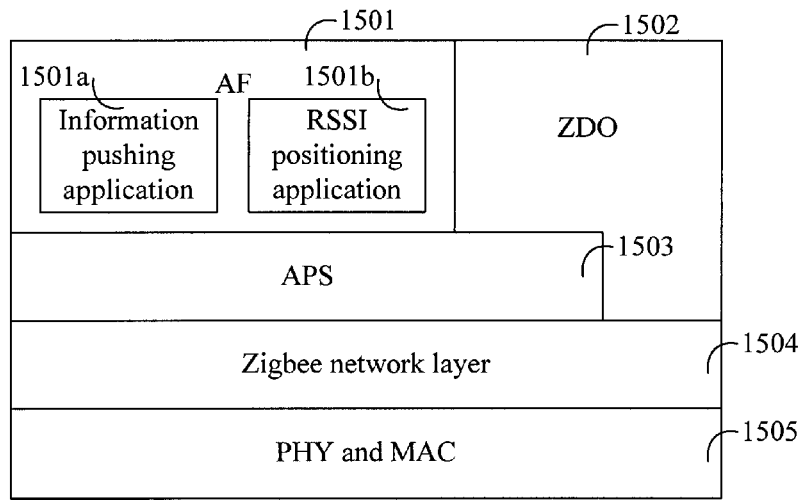
FIG. 15 is a schematic diagram illustrating implementation of a protocol stack on a node according to an embodiment of the present invention.

The modules, units, and subunits in this embodiment complete the function of pushing information by the node to the Zigbee mobile terminal, and specifically, may be implemented by applying a protocol stack. FIG. 15 is a schematic diagram illustrating implementation of a protocol stack on a node. The node includes:

an Application Framework (AF) 1501, configured to manage a Zigbee information push application module, or support other Zigbee application modules, for example, an RSSI positioning application and environment monitoring application;

a Zigbee Device Object (ZDO) 1502, configured to be responsible for management transactions of the node, define and adjust the type of the node (such as a coordinator, a router, or an end node), initiate and maintain device discovery and service discovery in the Zigbee information push network, and be responsible for initialization, security management, network management, and binding management on the Zigbee application support sublayer, the Zigbee information push network layer, and a security service provider;

an APplication Support sublayer (APS) 1503, configured to maintain the mapping relationship between two network node application objects that create services, when a message enters in the Zigbee device, transmit the message to a corresponding application object, and process the mapping relationship between a 64-bit IEEE address and a 16-bit network address;

a Zigbee network layer 1504, configured to define a method for joining and leaving a network and a method for sending a message to a corresponding destination, search for and maintain multi-hop paths between nodes, search for and store neighbor node information, initiate and maintain a network and set various network parameters as a network coordinator, and allocate an addresses for devices that join the network, and specify network address allocation principles; and a Physical Layer (PHY) and Media Access Control Sublayer (MAC) 1505, configured to implement sending and receiving of packets. In this embodiment, the PHY and MAC 1505 is responsible for sending out the Zigbee broadcast message and/or the Zigbee information response message generated by an application layer, and sending out the Zigbee information request message received from the Zigbee mobile terminal and the Zigbee information response message received from the gateway.

The AF 1501, ZDO 1502, and APS 1503 belong to a Zigbee application layer. The Zigbee application layer further includes application-based objects. Many types of application objects include, but are not limited to, an information push application 1501a and an RSSI positioning application 1501b. The information push application 1501a is an application newly defined by embodiments of the present invention, and is configured to push information to the Zigbee mobile terminal.

The AF 1501 is further configured to provide an interface for the application object and the APS 1503. The APS 1503 provides an interface between the Zigbee network layer 1504 and the Zigbee application layer.

Division of the protocol stack enables the node in this embodiment to have functions such as route discovery, routing table maintenance, and packet forwarding in the Zigbee multi-hop network, and from the point of view of application, enables the node to have an interface with the information push application or other Zigbee applications. As an information pusher, the node also has the function of a server of Zigbee information push applications, and relative to the AS, the node implements the function of a client when obtaining the push information from the AS.

Figure 16:
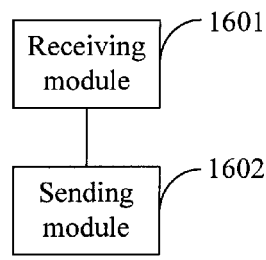
FIG. 16 is a structure diagram of a gateway according to an embodiment of the present invention.

As shown FIG. 16, this embodiment provides a gateway, where the gateway specifically includes:

a receiving module 1601, configured to receive a Zigbee information request message sent by a Zigbee mobile terminal in a Zigbee information push network, and receive a Zigbee information response message that carries push information and is returned by an AS; and a sending module 1602, configured to forward the Zigbee information request message received by the receiving module 1601 to the AS, and forward the Zigbee information response message received by the receiving module 1601 to the Zigbee mobile terminal.

In this embodiment, the Zigbee information request message sent by the Zigbee mobile terminal may carry or may not carry preference information. If the Zigbee information request message carries the preference information, the gateway forwards the Zigbee information request message to the AS, and the AS pushes corresponding information to the gateway according to the preference information, and the gateway provides the corresponding information to the Zigbee mobile terminal.

In this embodiment, the gateway receives the request initiated by the Zigbee mobile terminal, and obtains the push information from the AS and then forwards the push information to the Zigbee mobile terminal, thereby implementing information push of the gateway to the Zigbee mobile terminal in the case that the Zigbee information node cannot provide push information, so that the transmission range of the information push service is extended, and information push in the range of 10 meters to 100 meters can be implemented. Further, information can be pushed according to the preference information sent by the Zigbee mobile terminal, so that the favorite information of the user can be pushed to the Zigbee mobile terminal. Because no base station is required, the cost is greatly reduced. Compared with the conventional mode in which the positioning service system pushes information according to the position information sent by the GPS-enabled mobile terminal, a GPS receiver is not required to be built in the terminal, so that the cost is reduced, and the disadvantages that the precision of positioning and pushing is influenced by the environment where the mobile terminal is located, and the positioning effect is poor, are overcome. Compared with the conventional mode in which a Bluetooth information push node is disposed for information push, the disadvantages that the energy consumption of Bluetooth devices is high, the networking capability is poor, the transmission distance is limited, and the maximum range is only 10 meters, are overcome.

Figure 17:
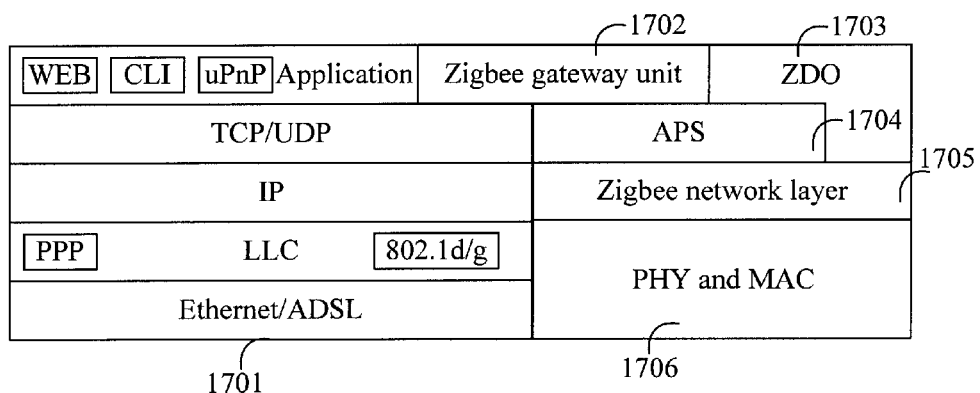
FIG. 17 is a schematic diagram illustrating implementation of a protocol stack on a gateway according to an embodiment of the present invention.

As shown in FIG. 17, the gateway according to in this embodiment can be implemented by applying a protocol stack. The gateway has functions of both a common gateway and a Zigbee gateway, is configured with the Ethernet, the Asymmetrical Digital Subscriber Loop (ADSL), and a Zigbee interface, and can be connected to the Zigbee information push network and the IP network simultaneously. The gateway specifically includes: a gateway unit 1701, a Zigbee gateway unit 1702, a ZDO 1703, an APS 1704, a Zigbee network layer 1705, and a PHY and MAC 1706. The gateway unit 1701 is configured to implement the function of the common gateway, and is specifically formed of an Ethernet/ADSL interface layer, an Logical Link Control layer (LLC layer, supporting the PPP and 802.1d/g protocol), an IP layer, a Transmission Control Protocol (TCP)/IP layer, and an application layer, where the application layer supports Web, Command-line Interface (CLI) and universal Plug and Play (uPnP) protocols. The Zigbee gateway unit 1702 is configured to use the Zigbee technology to implement the mutual access between the device in the Zigbee information push network and the device in the IP network, so as to push information to the Zigbee mobile terminal. Functions of the ZDO 1703, the APS 1704, the Zigbee network layer 1705, and the PHY and MAC 1706 are the same as those described in the embodiment shown in FIG. 15, and are not described herein further. Through the gateway according to this embodiment, the AS at the IP network side may implement mutual access with all devices in the Zigbee information push network, and support configuring information and function options of information nodes in the Zigbee information push network.

Figure 18:
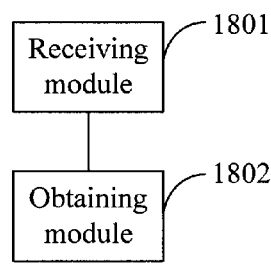
FIG. 18 is a first structure diagram of a mobile terminal according to an embodiment of the present invention.

As shown in FIG. 18, this embodiment provides a mobile terminal, where the mobile terminal specifically includes:

a receiving module 1801, configured to receive a Zigbee message sent by a Zigbee information node in a Zigbee information push network, where the Zigbee message carries push information; and an obtaining module 1802, configured to extract push information of the Zigbee information node from the Zigbee message received by the receiving module 1801.

Figure 19:
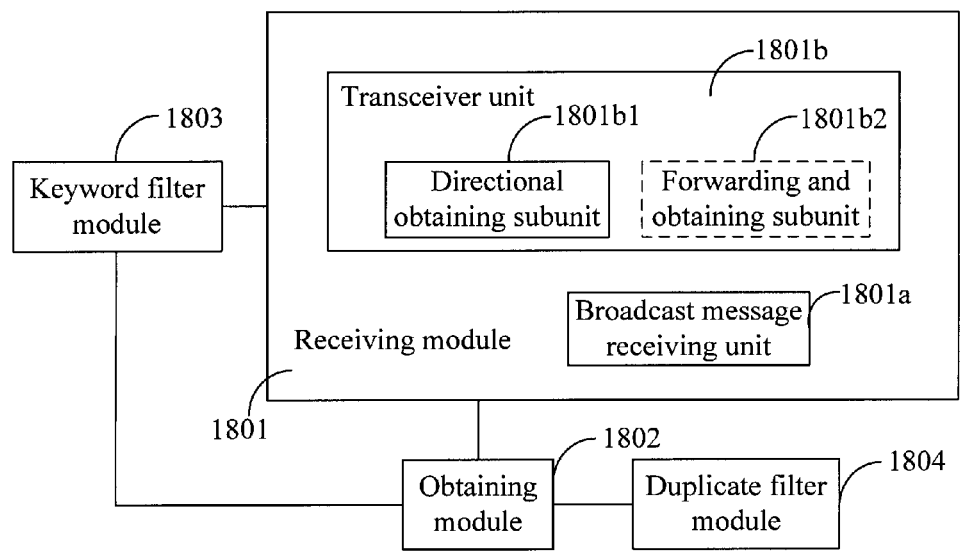
FIG. 19 is a second structure diagram of a mobile terminal according to an embodiment of the present invention.

As shown in FIG. 19, the receiving module 1801 may specifically include:

a broadcast message receiving unit 1801a, configured to receive a Zigbee broadcast message sent by the Zigbee information node in the Zigbee information push network; and/or, a transceiver unit 1801b, configured to send a Zigbee information request message to the Zigbee information node in the Zigbee information push network, and if the Zigbee information node stores the push information requested by the mobile terminal, receive the Zigbee information response message that carries push information and is returned by the Zigbee information node. In FIG. 19, the receiving module 1801 including both a broadcast message receiving unit 1801a and a transceiver unit 1801b is used as an example.

Further, the transceiver unit 1801 may include:

a directional obtaining subunit 1801b1, configured to: if the Zigbee information node stores no push information requested by the mobile terminal, receive a gateway address returned by the Zigbee information node, send a Zigbee information request message to a gateway according to the gateway address, receive the Zigbee information response message returned by the gateway after the gateway receives the request, and obtain push information from the Zigbee information response message; or a forwarding and obtaining subunit 1801b2, configured to: if the Zigbee information node stores no push information requested by the mobile terminal, receive the Zigbee information response message that is returned by the Zigbee information node after the Zigbee information node obtains push information from the AS through the gateway, and obtain push information from the Zigbee information response message.

As shown in FIG. 19, the receiving module 1801 in any one of the mobile terminals is further configured to receive a push information keyword returned by the Zigbee information node. Accordingly, the mobile terminal further includes:

a keyword filter module 1803, configured to filter, according to the push information keyword received by the receiving module 1801, the push information obtained by the obtaining module 1802, which is based on the preference filtering mode;

and/or, the mobile terminal further includes: a duplicate filter module 1804, configured to discard the push information obtained by the obtaining module 1802 if the push information obtained by the obtaining module 1802 is the same as the push information obtained by the mobile terminal, which is based on the duplicate filtering mode.

In this embodiment, the preference filtering mode and the duplicate filtering mode may be used separately, or may be used in combination.

Figure 20:
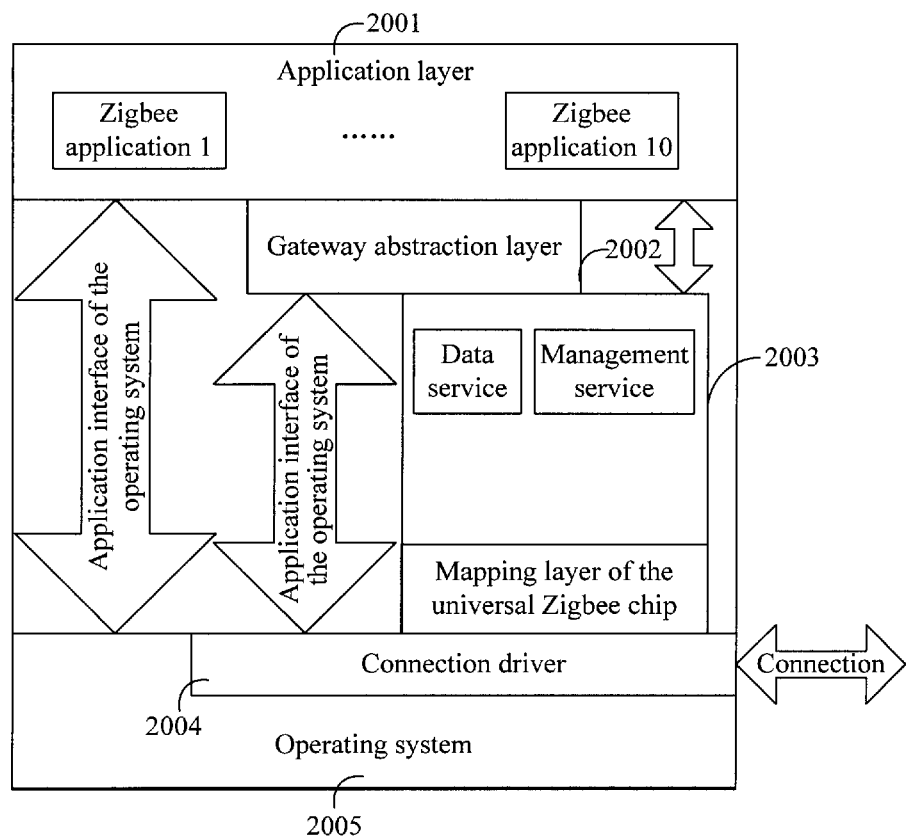
FIG. 20 is a schematic diagram illustrating implementation of a protocol stack on a mobile terminal according to an embodiment of the present invention.

The mobile terminal according to this embodiment may be implemented by applying a protocol stack. As shown in FIG. 20, the mobile terminal specifically includes:

an application layer 2001, configured to perform different processing on data for different applications, where the applications may include many types on the application layer and include at least the application newly defined in embodiments of the present invention and the Zigbee information push application, and may further include other Zigbee applications not used in information push, and may also include other non-Zigbee applications such as an RSSI positioning application, and in FIG. 20, the application layer having 10 Zigbee applications including the Zigbee information push application is used as an example;

a gateway abstraction layer 2002, configured to enable the mobile terminal to have the gateway function;

a Zigbee adapter 2003, configured to convert data related to a Zigbee chip, and perform data service processing and management service processing, including data service, management service, and a mapping layer of a universal Zigbee chip, where the data service processing refers to processing the data-related service, and the management service processing refers to processing the management task in the communication between the mobile terminal processor and the Zigbee chip;

a connection driver 2004, configured to receive and send data to implement the communication between the mobile terminal and the outside world; and an operating system 2005, configured to provide an operating environment for the mobile terminal.

The mobile terminal may be configured with a mobile communication network interface and a Zigbee interface simultaneously. The mobile communication network includes the General Packet Radio Service (GPRS) network, the Enhanced Data Rate for GSM Evolution (EDGE) network, or the Code Division Multiple Access (CDMA) network. At the application layer, as a client terminal of the information push application, the mobile terminal may obtain push information from the information node of the Zigbee information push network.

The mobile terminal according to this embodiment can obtain the push information through the Zigbee technology, and compared with the prior art, the transmission range for obtaining the information push service is larger, and information obtaining in the range of 10 meters to 100 meters can be implemented. Further, the mobile terminal according to this embodiment can filter the obtained push information, thereby improving the user experience. Because no base station is required, the cost is greatly reduced. Compared with the conventional mode in which the positioning service system pushes information according to the position information sent by the GPS-enabled mobile terminal, a GPS receiver is not required to be built in the terminal, so that the cost is reduced, and the disadvantages that the precision of positioning and pushing is influenced by the environment where the mobile terminal is located, and the positioning effect is poor, are overcome. Compared with the conventional mode in which a Bluetooth information push node is disposed for information push, the disadvantages that the energy consumption of Bluetooth devices is high, the networking capability is poor, the transmission distance is limited, and the maximum range is only 10 meters, are overcome.

Figure 21:
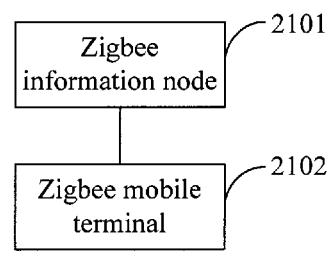
FIG. 21 is a first structure diagram of a system for pushing information according to an embodiment of the present invention.

As shown in FIG. 21, this embodiment provides a system for pushing information, where the system includes a Zigbee information node 2101 and a Zigbee mobile terminal 2102.

The Zigbee information node 2101 is configured to generate a Zigbee message, add push information to the Zigbee message, and send the Zigbee message carrying the push information to the Zigbee mobile terminal 2102.

In this embodiment, the system may further include:

an AS, configured to send the push information to the Zigbee information node after the Zigbee information node joins the Zigbee information push network, which is based on the online configuration mode of push information;

and/or, a Zigbee configuration device, configured to set up a temporary Zigbee network, and send the push information to the Zigbee information node after the Zigbee information node joins the temporary Zigbee network, which is based on the offline configuration mode of push information.

In this embodiment, the online configuration mode and the offline configuration mode may be used separately, or may be used in combination.

Figure 22:
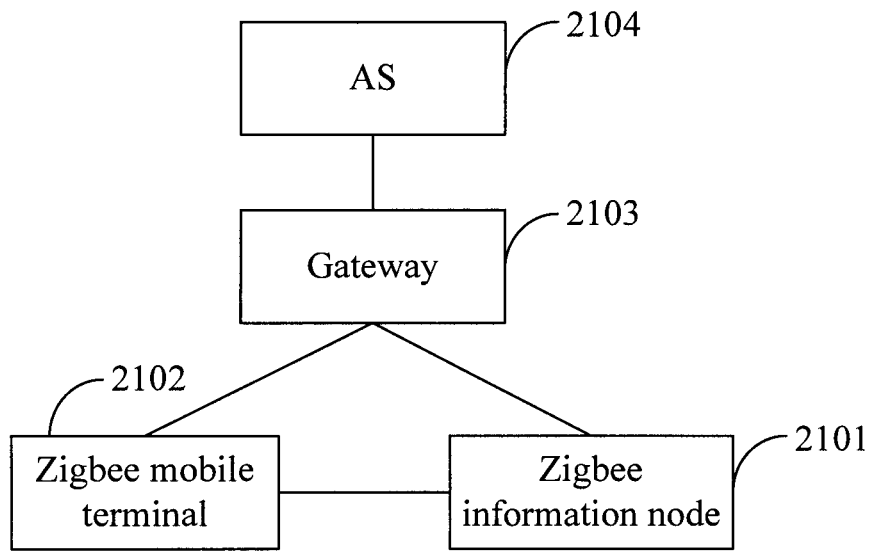
FIG. 22 is a second structure diagram of a system for pushing information according to an embodiment of the present invention.

Further, as shown in FIG. 22, the system may include a gateway 2103 and an AS 2104, where the Zigbee information node 2101 is specifically configured to receive the Zigbee information request message sent by the Zigbee mobile terminal 2102, judge whether the push information requested by the Zigbee mobile terminal is locally stored, and if the push information requested by the Zigbee mobile terminal is locally stored, generate a Zigbee information response message, add the push information to the Zigbee information response message, and send the Zigbee information response message carrying the push information to the Zigbee mobile terminal, or if the push information requested by the Zigbee mobile terminal is not locally stored, return a gateway address to the Zigbee mobile terminal 2102;

The gateway 2103 is configured to receive the Zigbee information request message sent by the Zigbee mobile terminal 2102 after the Zigbee mobile terminal 2102 receives the gateway address, forward the Zigbee information request message to the AS 2104, receive the Zigbee information response message that carries the push information and is returned by the AS 2104, and forward the Zigbee information response message to the Zigbee mobile terminal 2102.

The AS 2104 is configured to receive the Zigbee information request message sent by the gateway 2103, return the Zigbee information response message carrying the push information to the gateway 2103, where the AS 2104 may also configure the push information online for the Zigbee information node 2101, and/or, the Zigbee configuration device configures the push information offline for the Zigbee information node 2101, and in this case, the system further includes a Zigbee configuration device.

Figure 23:
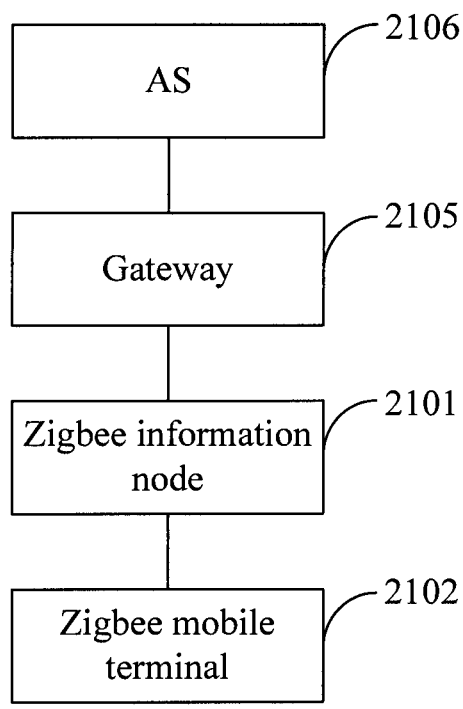
FIG. 23 is a third structure diagram of a system for pushing information according to an embodiment of the present invention.

In addition, as shown in FIG. 23, the system may include: a gateway 2105 and an AS 2106, where the Zigbee information node 2101 is specifically configured to receive the Zigbee information request message sent by the Zigbee mobile terminal 2102, judge whether the push information requested by the Zigbee mobile terminal is locally stored, and if the push information requested by the Zigbee mobile terminal is locally stored, generate a Zigbee information response message, add the push information to the Zigbee information response message, and send the Zigbee information response message carrying the push information to the Zigbee mobile terminal, or if the push information requested by the Zigbee mobile terminal is not locally stored, forward the Zigbee information request message to the gateway 2105, and forward the Zigbee information response message that carries the push information and is returned by the gateway 2105 to the Zigbee mobile terminal 2102.

The gateway 2105 is configured to receive the Zigbee information request message sent by the Zigbee information node 2101 and forward the Zigbee information request message to the AS 2106, receive the Zigbee information response message that carries push information and is returned by the AS 2106, and forward the Zigbee information response message to the Zigbee information node 2101.

The AS 2106 is configured to receive the Zigbee information request message sent by the gateway 2105, return the Zigbee information response message carrying the push information to the gateway 2105, where the AS 2106 may also configure the push information online for the Zigbee information node 2101, and/or, the Zigbee configuration device configures the push information offline for the Zigbee information node 2101, and in this case, the system further includes a Zigbee configuration device.

Figure 24:
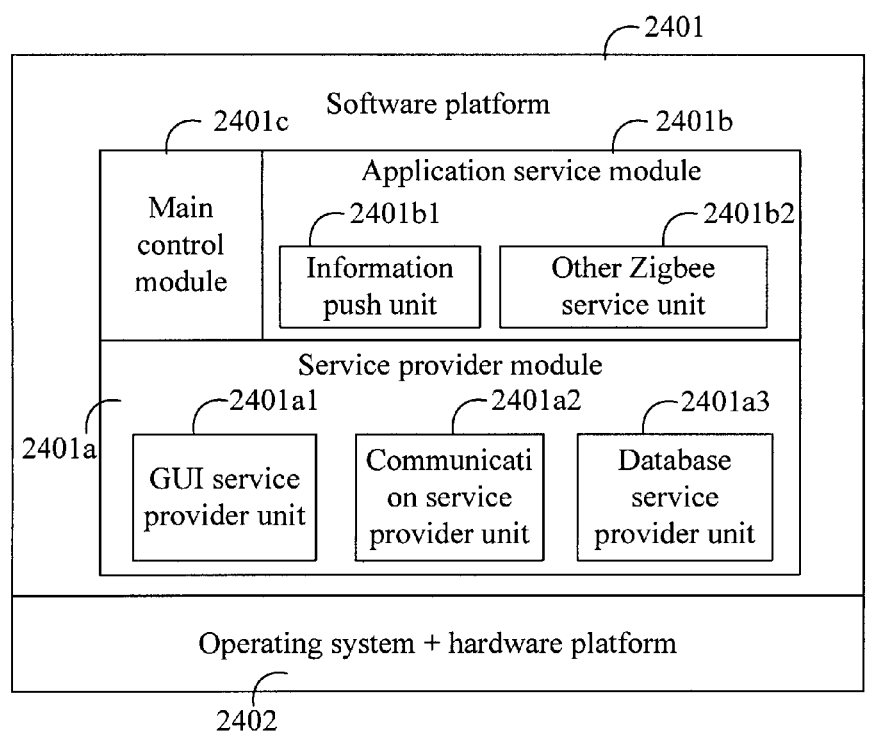
FIG. 24 is a structure diagram of an AS in a system for pushing information according to an embodiment of the present invention.

Any one of the ASs according to this embodiment may obtain state information such as network topology and remaining energy of the node of the Zigbee information push network through the gateway, obtain application data, and display the data on a friendly interface to the user. The AS may also configure operating parameters of the Zigbee information push network through the gateway, or send commands to the Zigbee information push network. As shown in FIG. 24, the AS may include a software platform 2401, an operating system and hardware platform 2402, where the software platform 2401 includes a service provider module 2401a, an application service module 2401b, and a main control module 2401c. The service provider module 2401a includes a Graphical User Interface (GUI) service provider unit 2401a1, a communication service provider unit 2401a2, and a database service provider unit 2401a3; the application service module 2401b includes an information push service unit 2401b1 and other Zigbee service unit 2401b2, such as an RSSI positioning service unit, an environment monitoring service unit, and a network management service unit. The main control module 2401c mainly controls and schedules the application service module and the service provider module.

Through the system according to this embodiment, information is pushed to the Zigbee mobile terminal, so that the transmission range of the information push service is extended, and information push in the range of 10 meters to 100 meters can be implemented. The active pushing mode and/or the request/response push mode may be used, and push information may be configured online and offline for the Zigbee information node. Therefore, the application is more flexible and convenient, the user experience is improved. Because no base station is required, the cost is greatly reduced. Compared with the conventional mode in which the positioning service system pushes information according to the position information sent by the GPS-enabled mobile terminal, a GPS receiver is not required to be built in the terminal, so that the cost is reduced, and the disadvantages that the precision of positioning and pushing is influenced by the environment where the mobile terminal is located, and the positioning effect is poor, are overcome. Compared with the conventional mode in which a Bluetooth information push node is disposed for information push, the disadvantages that the energy consumption of Bluetooth devices is high, the networking capability is poor, the transmission distance is limited, and the maximum range is only 10 meters, are overcome.

All or a part of the technical solutions according to the embodiments of the present invention may be implemented by a program instructing relevant hardware. The program may be stored in readable storage media. The storage media may be any media capable of storing program codes, such as a Read Only Memory (ROM), a Random Access Memory (RAM), a magnetic disk, or an optical disk.

The above descriptions are merely exemplary embodiments of the present invention, but are not intended to limit the present invention. Any modifications, equivalent replacements, or improvements made by those skilled in the art without departing from the spirit and scope of the invention shall fall within the scope of the present invention.

What is claimed is:
1. A method for obtaining information, comprising:
receiving a Zigbee message from a stationary Zigbee information node; and extracting push information of the Zigbee information node from the Zigbee message;
wherein the receiving the Zigbee message from the Zigbee information node specifically comprises:
receiving a Zigbee broadcast message that carries push information and is sent from the Zigbee information node;
or,
before the receiving the Zigbee message from the Zigbee information node, the method further comprises:
sending a Zigbee information request message to the Zigbee information node;
the receiving the Zigbee message from the Zigbee information node specifically comprises:
receiving a Zigbee information response message that carries the push information and is returned by the Zigbee information node if the Zigbee information node stores push information requested by the Zigbee information request message; and
wherein after the sending the Zigbee information request message to the Zigbee information node, the method further comprises:
receiving a gateway address that is returned by the Zigbee information node if the Zigbee information node stores no push information requested by the Zigbee information request message, sending a Zigbee information request message to a gateway according to the gateway address, receiving a Zigbee information response message returned by the gateway, and obtaining push information from the Zigbee information response message; or
receiving a Zigbee information response message that is returned by the Zigbee information node after obtaining push information from an Application Server (AS) through the gateway if the Zigbee information node stores no push information requested by the Zigbee information request message, and obtaining push information from the Zigbee information response message.

2. A method for obtaining information, comprising:
receiving a Zigbee message from a stationary Zigbee information node; and
extracting push information of the Zigbee information node from the Zigbee message;
receiving, after the extracting push information, a push information keyword sent by the Zigbee information node, and filtering the obtained push information according to the push information keyword; and/or
when push information obtained currently is the same as push information already obtained, discarding the push information obtained currently.

3. A mobile terminal, comprising:
a processor and a non-transitory computer readable storage medium storing programming for execution by the processor, the programming including instructions to:
receive a Zigbee message sent by a stationary Zigbee information node in a Zigbee information push network; and
extract push information of the Zigbee information node from the Zigbee message received;
wherein the programming includes instructions to: receive a Zigbee broadcast message sent by the Zigbee information node in the Zigbee information push network; and/or,
send a Zigbee information request message to the Zigbee information node in the Zigbee information push network, and if the Zigbee information node stores requested push information, receive a Zigbee information response message that carries the push information and is returned by the Zigbee information node;
wherein the programming includes instructions to: if the Zigbee information node stores no requested push information, receive a gateway address returned by the Zigbee information node, send a Zigbee information request message to a gateway according to the gateway address, receive a Zigbee information response message returned by the gateway after the gateway receives the request, and obtain push information from the Zigbee information response message; or
if the Zigbee information node stores no requested push information, receive a Zigbee information response message that is returned by the Zigbee information node after the Zigbee information node obtains push information from an Application Server (AS) through the gateway, and obtain the push information from the Zigbee information response message.

4. A mobile terminal, comprising:
a processor and a non-transitory computer readable storage medium storing programming for execution by the processor, the programming including instructions to:
receive a Zigbee message sent by a stationary Zigbee information node in a Zigbee information push network; and
extract push information of the Zigbee information node from the Zigbee message received wherein the programming includes instructions to: receive a push information keyword returned by the Zigbee information node;
filter, according to the push information keyword, the push information obtained; and/or
discard the push information obtained if the push information is duplicative.

5. A system for pushing information, capable of communicating with a Zigbee mobile terminal, comprising:
a stationary Zigbee information node, configured to generate a Zigbee message, add push information to the Zigbee message, and send the Zigbee message carrying the push information to the Zigbee mobile terminal;
a gateway and an Application Server (AS), wherein
the Zigbee information node is specifically configured to receive a Zigbee information request message sent by the Zigbee mobile terminal, judge whether push information requested by the Zigbee mobile terminal is locally stored, and if the push information requested by the Zigbee mobile terminal is locally stored, generate a Zigbee information response message, add the push information to the Zigbee information response message, and send the Zigbee information response message carrying the push information to the Zigbee mobile terminal, and if the push information requested by the Zigbee mobile terminal is not locally stored, return an address of the gateway to the Zigbee mobile terminal;
the gateway is configured to receive the Zigbee information request message sent by the Zigbee mobile terminal after the Zigbee mobile terminal receives the gateway address, forward the Zigbee information request message to the AS, receive a Zigbee information response message that carries push information and is returned by the AS, and forward the Zigbee information response message to the Zigbee mobile terminal; and
the AS is configured to receive the Zigbee information request message sent by the gateway and return a Zigbee information response message carrying the push information to the gateway.

6. The system for pushing information according to claim 5, further comprising:

an Application Server (AS), configured to send push information to the Zigbee information node through a gateway after the Zigbee information node joins the Zigbee information push network; or a Zigbee configuration device, configured to set up a temporary Zigbee network, and send the push information to the Zigbee information node after the Zigbee information node joins the temporary Zigbee network.

7. A system for pushing information, capable of communicating with a Zigbee mobile terminal, comprising:

a stationary Zigbee information node, configured to generate a Zigbee message, add push information to the Zigbee message, and send the Zigbee message carrying the push information to the Zigbee mobile terminal; and a gateway and an Application Server (AS), wherein the Zigbee information node is specifically configured to receive a Zigbee information request message sent by the Zigbee mobile terminal, judge whether push information requested by the Zigbee mobile terminal is locally stored, and if the push information requested by the Zigbee mobile terminal is locally stored, generate a Zigbee information response message, add the push information to the Zigbee information response message, and send the Zigbee information response message carrying the push information to the Zigbee mobile terminal, and if the push information requested by the Zigbee mobile terminal is not locally stored, forward the Zigbee information request message to the gateway, and forward the Zigbee information response message that carries push information and is returned by the gateway, to the Zigbee mobile terminal;

the gateway is configured to receive the Zigbee information request message sent by the Zigbee information node and forward the Zigbee information request message to the AS, receive the Zigbee information response message that carries the push information and is returned by the AS, and forward the Zigbee information response message to the Zigbee information node; and the AS is configured to receive the Zigbee information request message sent by the gateway and return a Zigbee information response message carrying the push information to the gateway.

* * * * *